UNITED STATES PATENT OFFICE.

LEOPOLD HESSE AND OSCAR GÜNTHER, OF ELBERFELD, AND ARTHUR ZART, OF VOH-WINKEL, NEAR ELBERFELD, GERMANY, ASSIGNORS TO FARBENFABRIKEN VORM. FRIEDR. BAYER & CO., OF ELBERFELD, GERMANY, A CORPORATION OF GERMANY.

AZO DYE.

933,448. Specification of Letters Patent. Patented Sept. 7, 1909.

No Drawing. Application filed April 8, 1909. Serial No. 488,700.

*To all whom it may concern:*

Be it known that we, LEOPOLD HESSE, OSCAR GÜNTHER, and ARTHUR ZART, doctors of philosophy, chemists, citizens of the German Empire, residing at, respectively, Elberfeld, and Vohwinkel, near Elberfeld, Kingdom of Prussia, Germany, have invented new and useful Improvements in Azo Dyestuffs, of which the following is a specification.

Our present invention relates to the manufacture and production of new secondary disazo dyestuffs dyeing cotton from red to blue shades which are remarkable for their extraordinary fastness to light.

The new dyes are obtained by first producing aminoazo compounds from diazotized amins of the benzene series containing a negative group in ortho-position to the amino-group with suitable amins, then diazotizing these intermediate products and combining the thus produced diazoazo compounds with 2-amino-5-naphthol compounds having the formula:

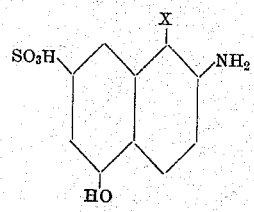

(X meaning hydrogen or $SO_3H$).

To produce the aminoazo compounds from diazo compounds which combine only with difficulty one can make use of the process described in British Letters Patent 11343 of 1899.

The new dyestuffs are in the shape of their alkaline salts dark powders easily soluble in water. Upon reduction with stannous chlorid and hydrochloric acid the dyestuffs are decomposed, an ortho-substituted amin, a diamin and a derivative of a 2.6-diamino-5-naphthol compound having the formula:

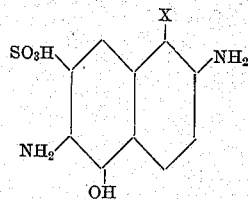

(X meaning hydrogen or $SO_3H$) are obtained. They dissolve in concentrated sulfuric acid with from a violet to green color.

In order to carry out this process we can *e. g.* proceed as follows, the parts being by weight: 173.5 parts of anilin-ortho-sulfonic acid are diazotized with 69 parts of sodium nitrite and the necessary quantity of hydrochloric acid and the diazo compound thus produced is then combined with 156.5 parts of para-xylidin hydrochlorid in the usual way with the addition of sodium acetate, the intermediate compound is redissolved in water and is then rediazotized at 15–20° C., the diazo compound is salted out and filtered off. It is stirred up with water to a paste and is added to a solution of 363 parts of 2-amino-5-naphthol-1.7-disulfonic acid containing an excess of sodium carbonate. The dyestuff is then isolated in the usual way. It is after being dried and pulverized in the shape of its sodium salt a dark green powder soluble in water with a red color and soluble in concentrated sulfuric acid with a greenish-blue color. By reduction with stannous chlorid and hydrochloric acid the dye is decomposed anilin-ortho-sulfonic acid, 2.5-dimethyl-1.4-diamino-benzene and 2.6-diamino-5-naphthol-1.7-disulfonic acid are formed. It dyes cotton fast bluish-reddish shades.

The process is carried out in an analogous manner on starting from other amins containing a negative group in ortho-position to the amino-group, such as para-toluidin-ortho-sulfonic acid, meta-xylidin-ortho-sulfonic acid, para-chloroanilin-ortho-sulfonic acid, para-nitranilin-ortho-sulfonic acid, anilin-2.4-disulfonic acid, ortho-nitranilin-para-sulfonic acid, or on using other middle components to form the aminoazo compounds, such as anilin, cresidin, alpha-naphthylamin-6- or 7-sulfonic acid, alpha-naphthylamin, or on using 2.5.7-aminonaphthol sulfonic acid as end component.

We claim:

1. The herein described new azo dyestuffs obtainable from aminoazo compounds which contain in the first component which is a benzene compound a negative group in ortho-position to the amino-group with the hereinbefore defined 2-amino-5-naphthol compounds, which dyestuffs are, after being dried and pulverized, in the shape of their alkaline salts dark powders soluble in water, soluble in concentrated sulfuric acid with from violet to green color; yielding upon reduction with stannous chlorid and hydrochloric acid an ortho-substituted amin of the benzene series, a diamin and a derivative of a 2.6-diamino-5-naphthol compound of the above given formula; and dyeing cotton from red to blue shades, substantially as described.

2. The herein described new azo dyestuff which can be obtained from anilin-ortho-sulfonic acid, para-xylidin and 2-amino-5-naphthol-1.7-disulfonic acid, which dyestuff is, after being dried and pulverized, in the shape of its sodium salt a dark green powder which is soluble in water with a red color and in concentrated sulfuric acid with a greenish-blue color; yielding upon reduction with stannous chlorid and hydrochloric acid anilin-ortho-sulfonic acid, 2.5-dimethyl-1.4-diaminobenzene and 2.6-diamino-5-naphthol-1.7-disulfonic acid; and dyeing cotton bluish-red shades, substantially as described.

In testimony whereof we have hereunto set our hands in the presence of two subscribing witnesses.

LEOPOLD HESSE. [L. S.]
OSCAR GÜNTHER. [L. S.]
ARTHUR ZART. [L. S.]

Witnesses:
OTTO KÖNIG,
C. J. WRIGHT.